Dec. 17, 1929.  A. C. CLARK  1,739,888
DREDGER
Filed Dec. 3, 1925   6 Sheets-Sheet 1
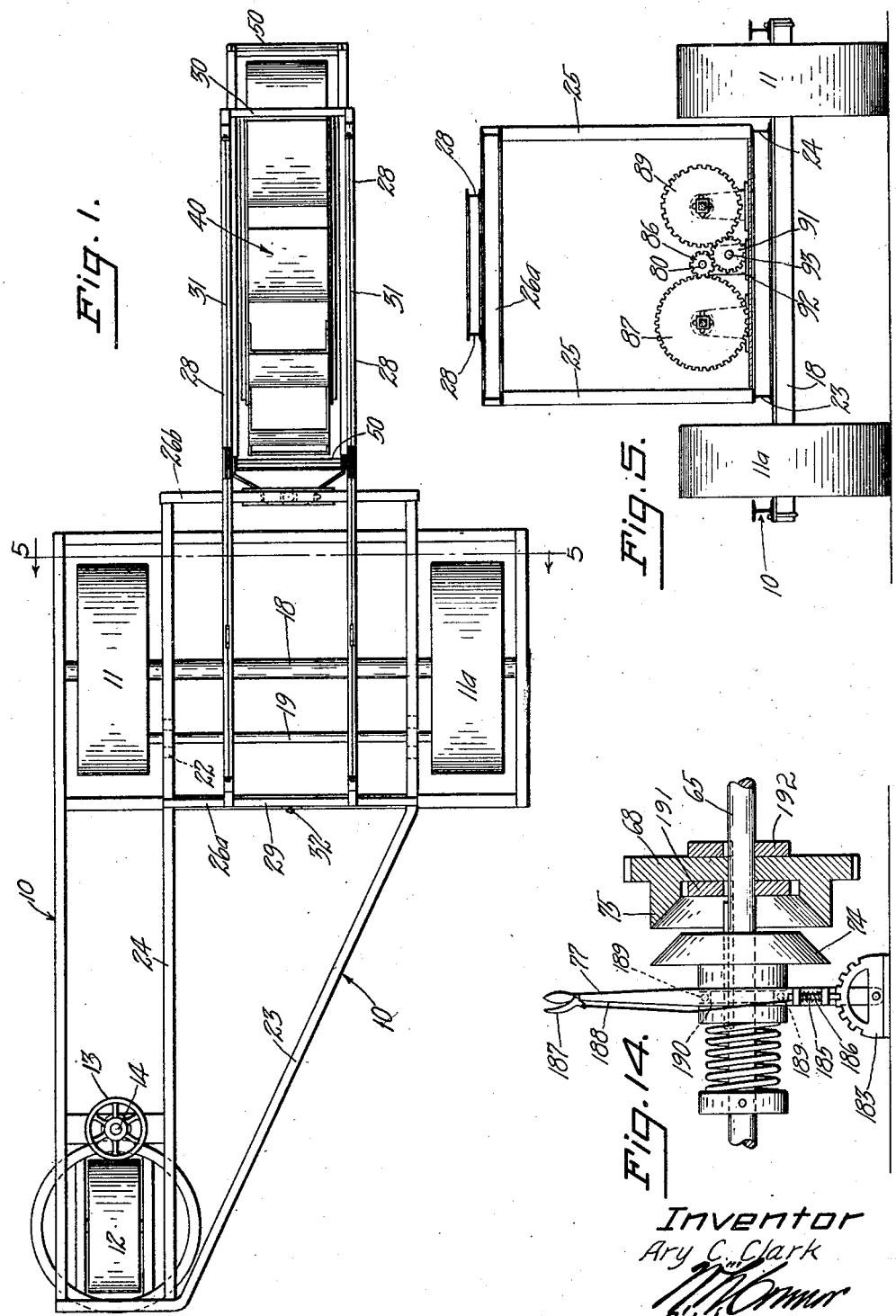

Dec. 17, 1929.  A. C. CLARK  1,739,888
DREDGER
Filed Dec. 3, 1925    6 Sheets-Sheet 2
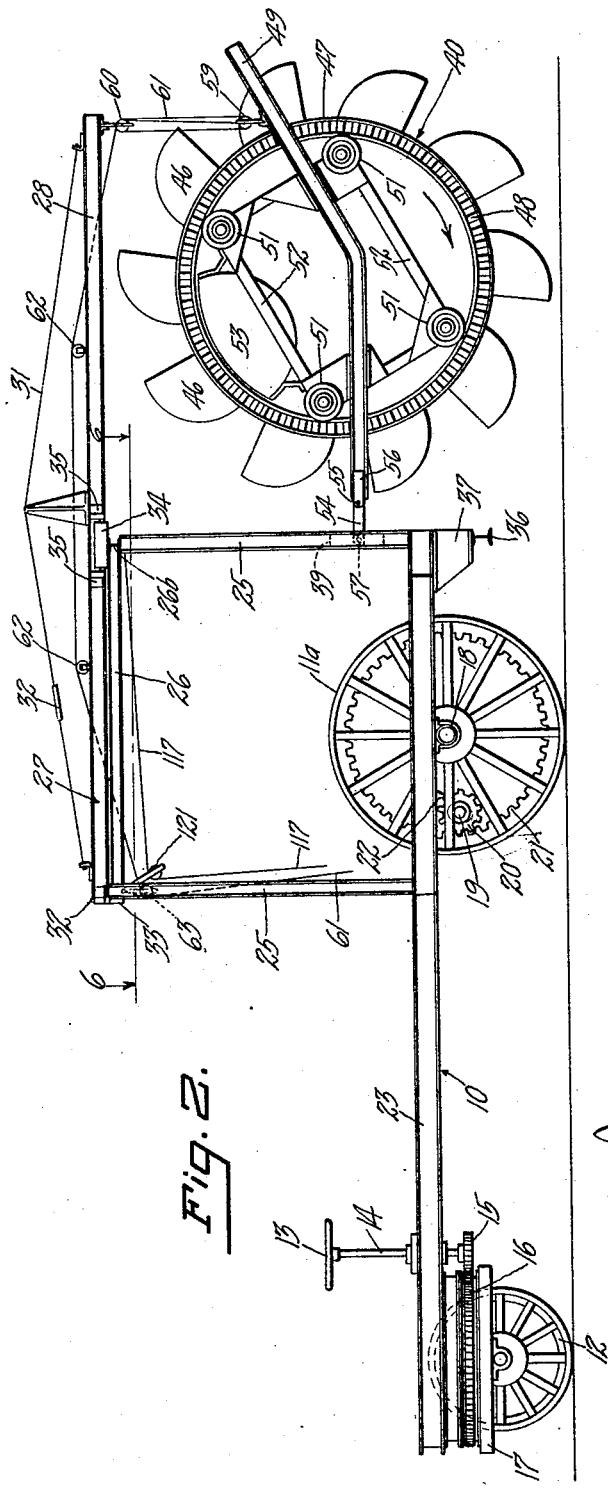
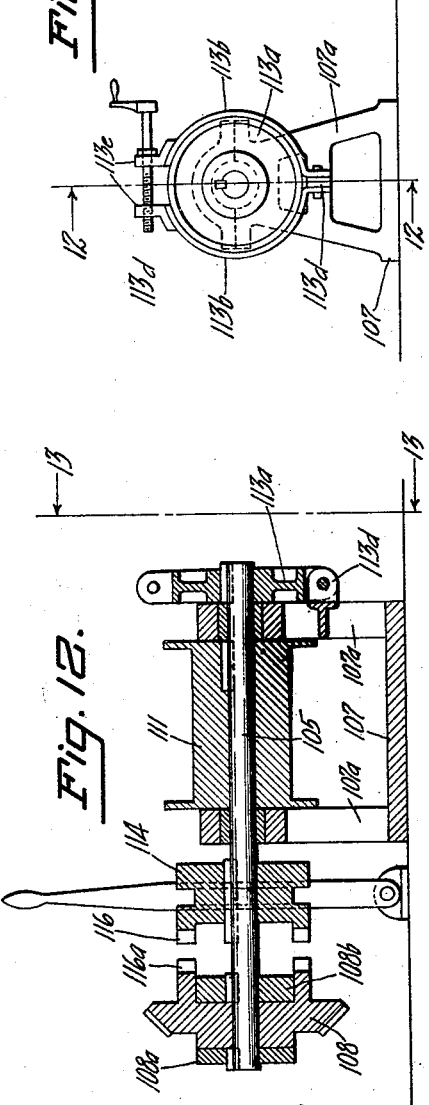

Dec. 17, 1929.  A. C. CLARK  1,739,888

DREDGER

Filed Dec. 3, 1925  6 Sheets-Sheet 3

Inventor
Ary C. Clark
Attorney

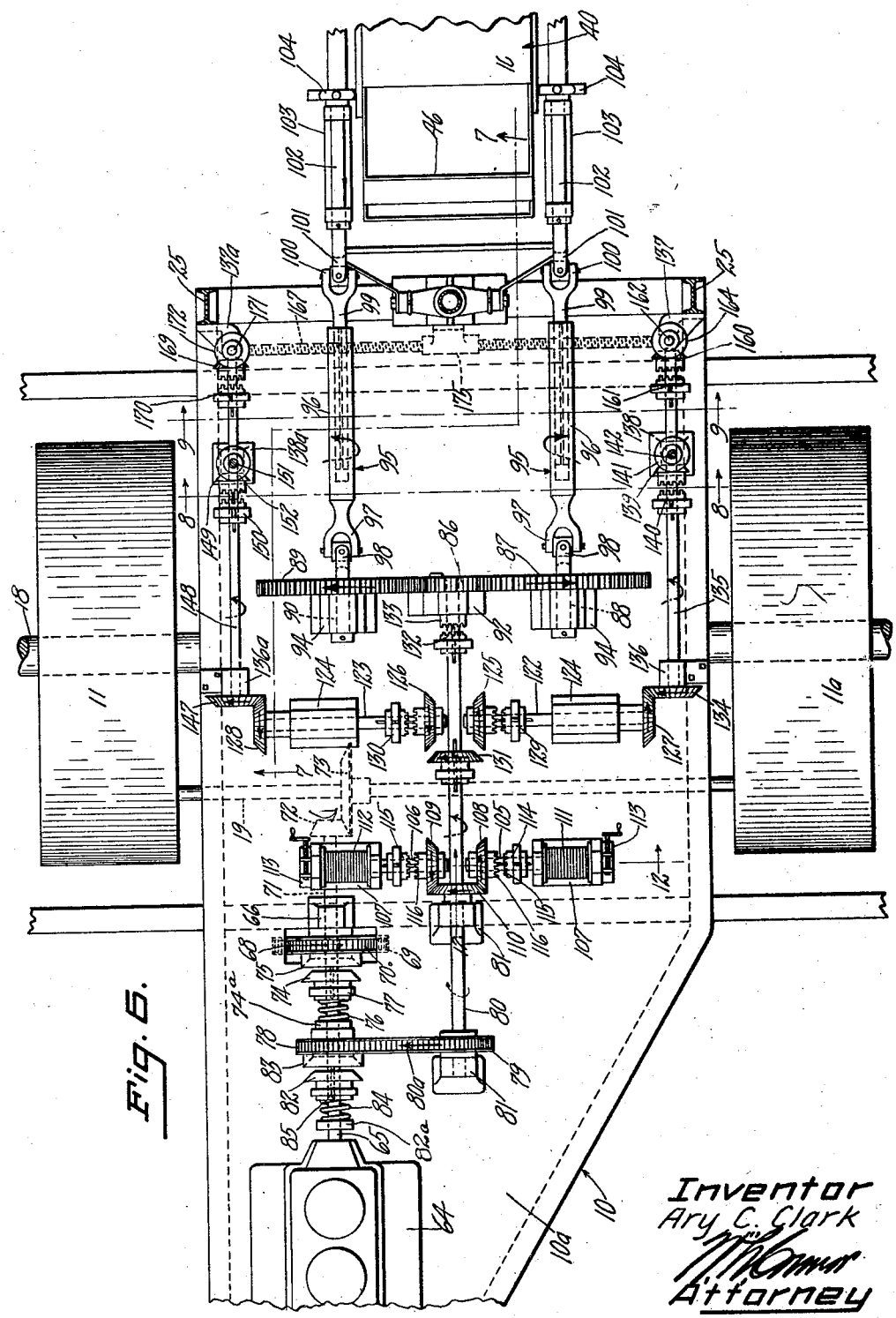

Dec. 17, 1929.　　　　A. C. CLARK　　　　1,739,888
DREDGER
Filed Dec. 3, 1925　　　6 Sheets-Sheet 5
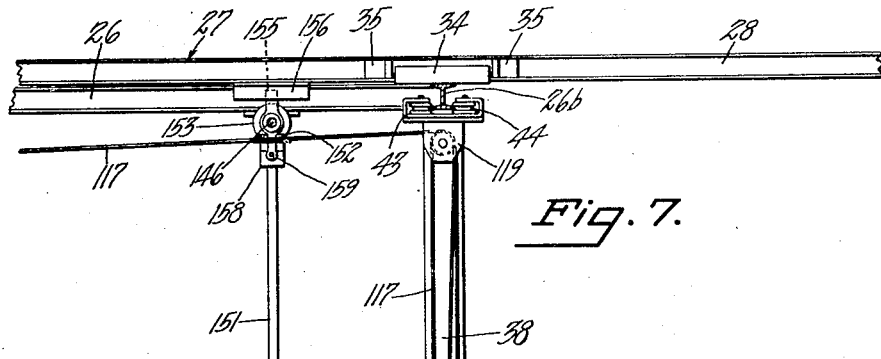
Fig. 7.
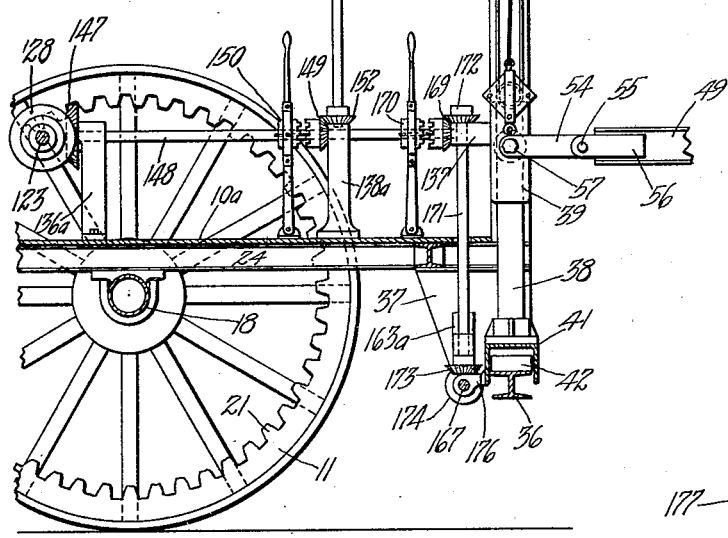
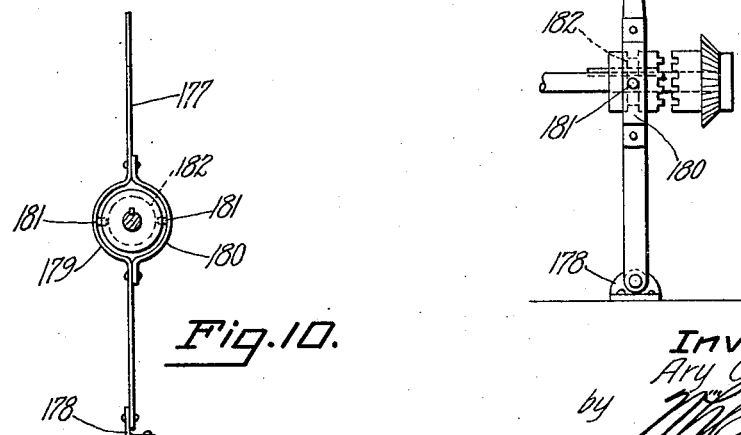
Fig. 11.
Fig. 10.
Inventor
Ary C. Clark
by
Attorney Dec. 17, 1929.  A. C. CLARK  1,739,888
DREDGER
Filed Dec. 3, 1925  6 Sheets-Sheet 6
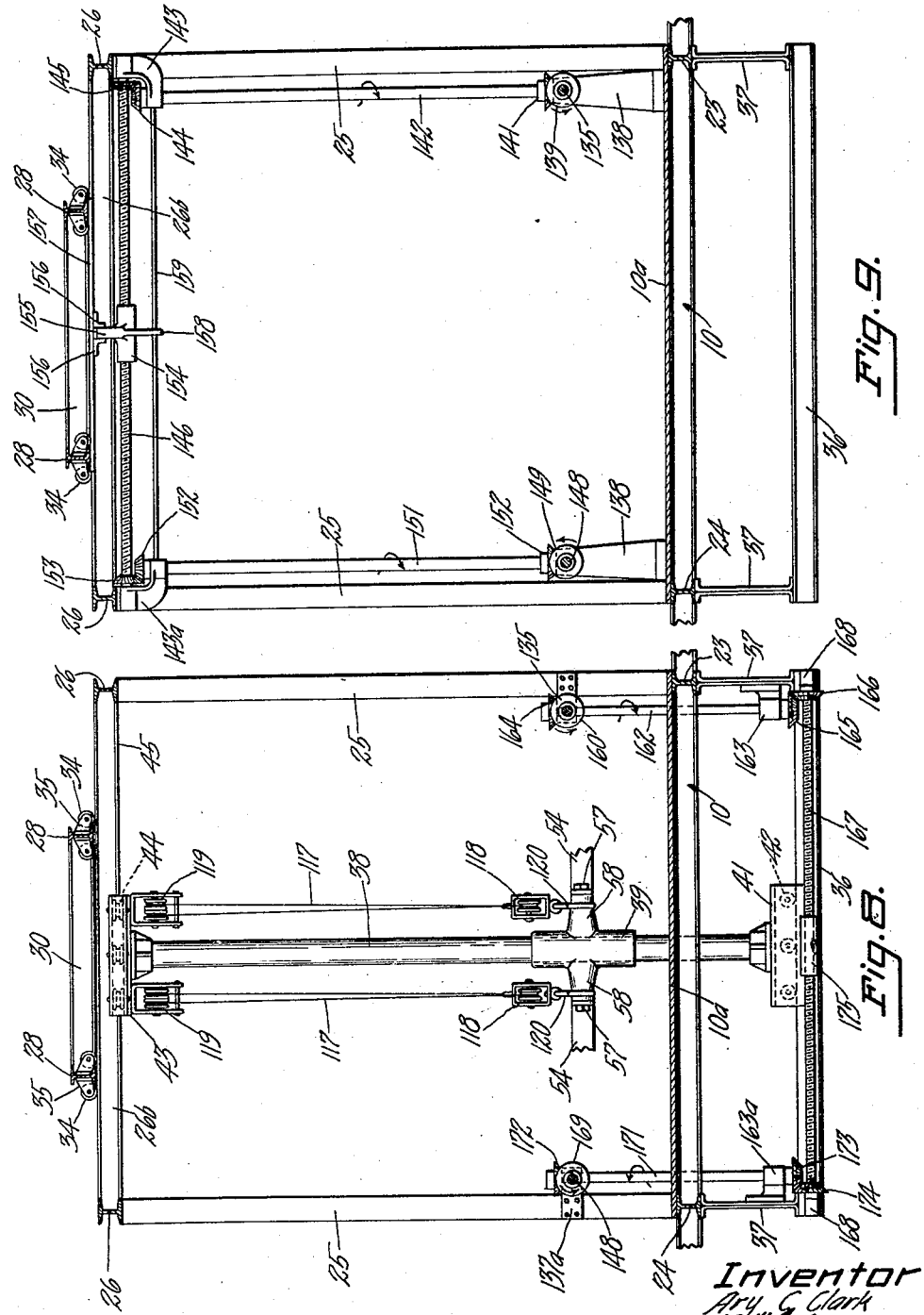

Patented Dec. 17, 1929

1,739,888

UNITED STATES PATENT OFFICE

ARY C. CLARK, OF BRAWLEY, CALIFORNIA

DREDGER

Application filed December 3, 1925. Serial No. 72,868.

My invention relates generally to dredgers, of the mobile or portable type, commonly used in the construction and maintenance of canals and ditches, as in irrigation, reclamation and drainage projects.

While I have termed my invention a "dredger," due to the fact that its principles of construction, arrangement and operation render it particularly adaptable to the maintenance of irrigation canals and drainage ditches, it is also designed for the construction of such waterways; and the same features which render it capable of excavating anything from a straight sided trench to canals or ditches of much greater width and depth, also conduce to its practical, efficient and economical use on maintenance work.

Canals and ditches, in irrigation and drainage projects, become clogged by the seasonal growth of vegetation along their banks and also by the settling of silt in their bottoms, greatly reducing their capacity; and the necessity of periodical cleaning has rendered the cost of maintenance of such waterways almost prohibitive. I am aware that some devices have been heretofore produced for mechanically cleaning ditches, but as a general rule these have been costly to build and operate, with the result that the work is mostly done by manual labor after first draining the waterway. Having these matters in mind, I have designed my dredger with a view to the accomplishment of these cleaning operations with a maximum of speed and efficiency and at a minimum of expense. With my device it is not necessary to drain the ditch as it works just as efficiently under water as on dry land.

A principal feature of my invention is the provision of means for adjusting the position of the digging wheel, on maintenance work, to conform to various slopes of ditch banks, so that the congesting matter may be thoroughly cleaned out without undue cutting away of the ditch bank. This is important, as repeated dredging, if not properly carried out, will result in widening of the ditch to an undesirable extent. This same adjustability renders my device capable of digging either straight sided trenches or ditches of various widths.

By the use of the principles of adjustment which I employ, and the manner in which the digging wheel is supported and operated, I am enabled to clean a greater amount of yardage per day, more efficiently and consequently at a less cost per yard, than has been heretofore obtained with dredgers of this character.

In the accompanying drawings I have illustrated the preferred specific embodiment of my invention; although it is to be understood that I reserve the right to make such changes and modifications in structure as may appear to come within the scope of my invention as expressed in the claims appended hereto.

Fig. 1 is a plan view of my dredge, showing the general arrangement of the frame work, unobstructed by details of the operating mechanism;

Fig. 2 is a side elevation, likewise showing the general arrangement of the frame work and digging wheel, unobstructed by details of the operating mechanism;

Fig. 5 is a transverse vertical section taken on the line 5—5 of Fig. 1;

Fig. 6 is an enlarged detailed plan view, taken as indicated by the lines 6—6 of Figs. 2 and 4, illustrating the digging wheel operating mechanism and the means for driving the dredge and adjusting the digging wheel;

Fig. 7 is an enlarged, fragmentary, longitudinal vertical sectional view, taken as indicated by the line 7—7 of Fig. 6;

Fig. 8 is a transverse vertical section, taken on the line 8—8 of Fig. 6;

Fig. 9 is a view similar to Fig. 8, taken on the line 9—9 of Fig. 6;

Fig. 10 is an enlarged detailed sectional view, illustrating one of the several clutches shown in Fig. 6;

Fig. 11 is a side elevation of the clutch mechanism illustrated in Fig. 10;

Fig. 12 is a sectional view taken as indicated by the lines 12—12 of Figs. 6 and 13;

Fig. 13 is an end elevation taken as indicated by the line 13—13 of Fig. 12; and Fig. 14 is a side elevation of a typical shift lever for the cone clutches.

Figure 3:
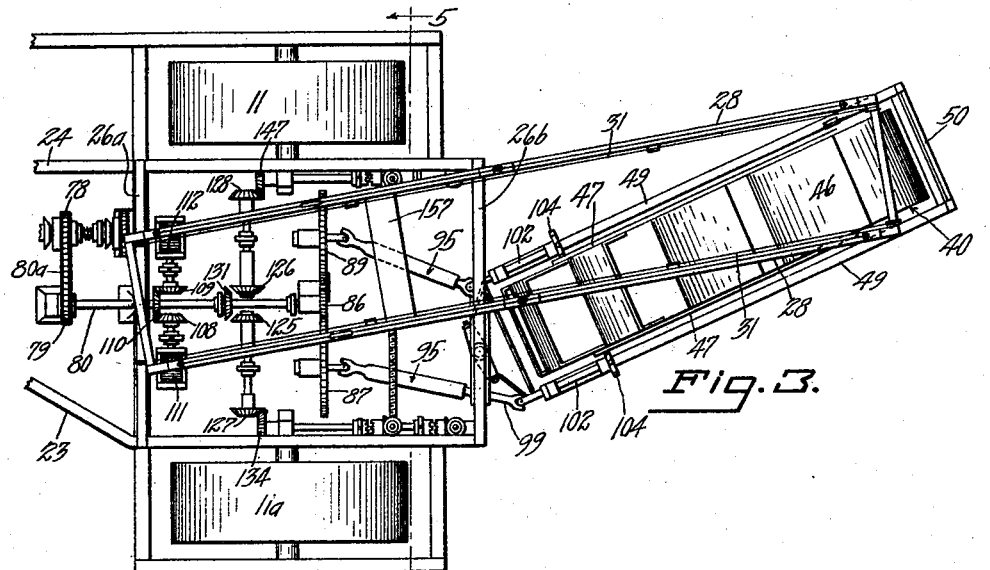
Fig. 3 is a fragmentary plan view, similar to Fig. 1, showing the general arrangement of the digging wheel operating mechanism and the manner of adjustably setting the digging wheel for operation.

Referring first to Figs. 1 and 2, the numeral 10 designates generally the main vehicle frame, which supports the digging wheel and operating mechanism to be hereinafter described. This frame is carried upon traction wheels 11 and 11ª and a front dirigible wheel 12; the latter being alined with the wheel 11 in order that the vehicle may operate astride of a ditch when used on maintenance work. The main carrying portion, including the frame 10 and wheels 11, 11ª and 12, may be constructed of any suitable width to operate astride of ditches of various widths; and, if desirable, the traction wheel 11ª may be arranged on longitudinally extensible members to vary the distance between it and the opposite traction wheel 11. As this feature is well known in the construction of dredges of this character I do not claim that it is any part of my invention.

The dirigible wheel 12 may be turned by means of the usual handwheel 13 on shaft 14, through the medium of a spur gear 15 on the lower end of the latter meshing with a circular rack 16 carried by the dirigible wheel frame 17.

The traction wheels 11 and 11ª are revolubly mounted upon a suitable shaft 18 and are driven through a drive shaft 19, having spur gears 20 fixed on its opposite ends and meshing with circular racks 21 carried by the traction wheels. (Figs. 2 and 6.) Shaft 19 may be revolubly journalled in suitable bearings 22 carried by the frame members 23 and 24.

A floor 10ª is supported on the frame members 23 and 24 (See Figs. 6, 7 and 8) but has been omitted in Figs. 1 and 2 for clarity of disclosure of these portions.

A superstructure, consisting of four uprights 25, joined at their upper ends by longitudinal brace members 26 and transverse members 26ª and 26ᵇ, is supported on the frame 10, and, in turn, supports a crane, generally designated by the numeral 27. This crane may be of any suitable design. In this case it consists of a pair of spaced, parallel members 28, rigidly joined together at their ends by transverse members 29 and 30, forming a substantially integral structure. Torsion rods 31 may be provided to furnish longitudinal stability and rigidity to the members 28.

The crane 27 is pivotally mounted to normally extend along the longitudinal center of the vehicle and to overhang the rear end of frame 10. Its pivot pin 32 turns in a bracket bearing 33, secured to the forward transverse frame member 26ª, so the crane, as a whole, swings about this as a center, as illustrated in Fig. 3.

Longitudinally disposed rollers 34, carried between suitable bearing blocks 35, secured to opposite sides of the members 28, non-frictionally support the frame members 28 upon the rear transverse frame member 26ᵇ. This insures ease of operation in swinging the crane about its pivot 32. The rollers 34 are of sufficient length to compensate for their arcuate movement relative to the frame member 26ᵇ.

A transversely disposed track 36 is suspended, by members 37, from the rear ends of frame members 23 and 24, directly beneath the upper rear transverse frame member 26ᵇ (see Fig. 6), and a vertically disposed standard 38 is movably carried between this track and the rear transverse frame member 26ᵇ, as shown in Fig. 8. This standard is preferably cylindrical and has a tubular guide shoe 39 slidably mounted thereon, for effecting vertical adjustment of the digging wheel 40, which I will more fully hereinafter explain. The standard 38 is movably supported at its lower end upon a channel shaped shoe 41, arranged to extend over and on either side of the track 36 and provided with non-friction bearing rollers 42. A shoe 43 is secured to the upper end of standard 38, which carries a plurality of grooved rollers 44 engaging opposite sides of the lower flange 45 of the transverse frame member 26ᵇ. Through these connections the standard 38 may be easily moved transversely of the frame 10 for effecting angular adjustment of the digging wheel 40, as later explained.

The digging wheel 40, may be of any suitable type, provided with a plurality of buckets 46, suitably spaced and arranged as is common in devices of this character. In this instance the buckets 46 are carried between a pair of suitably braced circular frame members 47, having teeth 48 on their outer faces, of the general character of ring gears. This wheel is revolubly supported between a pair of parallel side frame members 49, suitably braced and joined together at their opposite ends by transverse members 50, being supported upon a plurality of peripherally grooved rollers 51, carried upon sub-frame members 52 on the frame members 49, which engage over the inner edges of members 47. A discharge chute 53 may be carried by the sub-frame members 52 into which the contents of the buckets 46 are dumped. Any suitable means for conveying the earth from this chute, to one side of the machine, may be supplied, but as such means is well known in the art, it is not claimed as a part of my invention.

Figure 4:
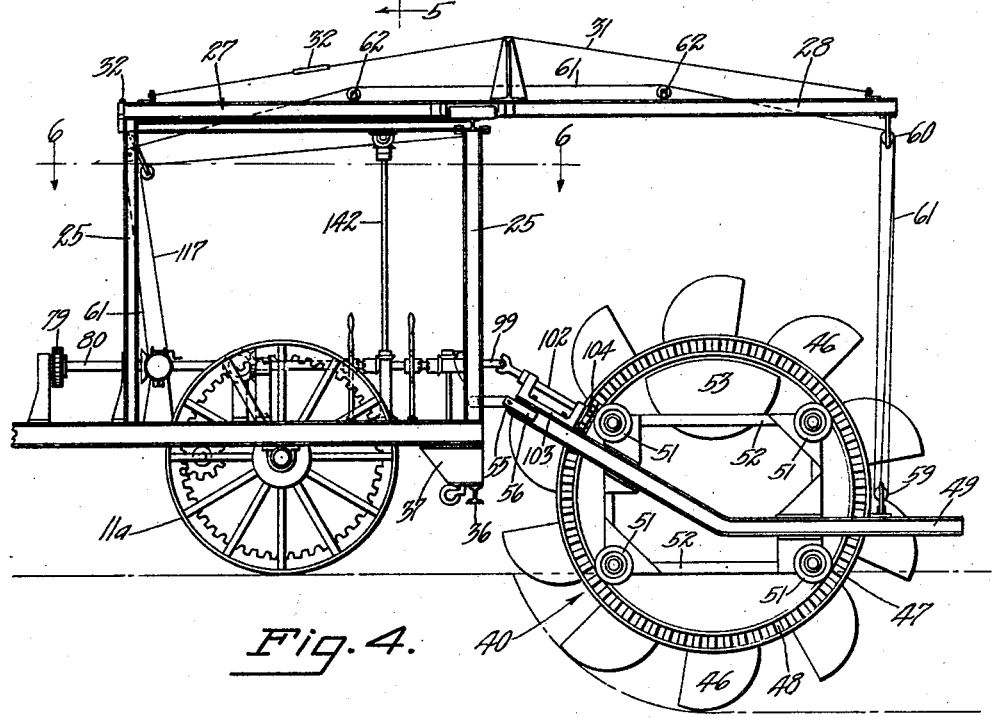
Fig. 4 is a fragmentary side elevation, similar to that shown in Fig. 2, illustrating the manner in which the digging wheel is lowered for digging operation.

Links 54 are pivotally connected at 55 to plates 56 on the inner ends of the frame members 49 and at their opposite ends are likewise pivotally connected, as at 57, to the ends of laterally disposed arms 58 on the guide shoe 39. By this means the digging wheel 40 may be swung vertically, as well as horizontally, relative to the vehicle, as shown in Figs. 2 and 4; in the former view it being shown raised for transportation and in the latter lowered for digging operation.

While the inner end of the digging wheel frame is thus supported for substantially universal movement, upon the frame 10, permitting both vertical and horizontal adjustment from this end, the outer end of its frame is supported by the crane 27. This is effected by means of pulleys 59 and 60, flexibly secured to the members 49 and 28, respectively, and cables 61 properly rove around the same and carried forward over pulleys 62 and 63; pulleys 62 being suitably supported upon the crane members 28. The utmost flexibility is afforded by these connections, which admits of substantially universal adjustment of the digging wheel.

While the limitations of the drawings prohibit illustrating adjustable movement of the digging wheel to its fullest extent, it may nevertheless be understood that the principles of my invention may be applied to dredges of this character wherein a wider range of adjustments may be afforded by swinging the digging wheel to a greater extent. The frame 10 may be constructed of greater width, giving to the track 36 and transverse frame member 26$^b$ a greater length, resulting in a greater extent of swinging movement of the crane 27 and also greater transverse movement of the standard 28.

From the arrangement hereinabove described it may be seen that practically any adjustment of the digging wheel 40 may be made, from the position illustrated in Fig. 1 to that shown in Fig. 3, depending entirely upon the extent of slope of the ditch bank it is desired to dredge; or, in the case of constructing new ditches, the width of ditch it is desired to dig. Thus if the device is being used for either dredging or cutting a new ditch, comparatively narrow in width, the degree of angularity of the digging wheel will be arranged accordingly; and if it is desired to either dredge or construct a wider ditch, then its degree of angularity, with reference to the longitudinal center of the machine, will be increased. By providing the combination of the crane 27, with its flexible connections to the rear, free end of the digging wheel frame and the flexible, universal connection of the forward end of the digging wheel frame with the transversely movable standard 28, the greatest extent of angular-adjustability may be afforded the digging wheel, consistent with a comparatively narrow vehicle. I will presently advert to the manner of effecting the several adjustments to suit varying conditions.

A single source of motive power, such as an internal combustion engine 64, may be used for operating my device. This is most clearly illustrated in Fig. 6. Its main drive shaft 65 is revolubly supported in its outer end in a suitable bearing 66. It may be here noted that substantially all of the operating mechanism is mounted upon the floor 10$^a$ upon the frame 10.

A spur driving gear 68, mounted to rotate freely upon shaft 65, is operatively connected with a similar gear 69, through the medium of a chain 70. Gear 69 is rigidly mounted upon a jack shaft 71, suitably supported on the under side of frame 10, and a pinion 72 fixed thereon meshes with a gear 73 keyed upon the main drive shaft 19. Through the medium of these connections driving motion is imparted to the traction wheels 11 and 11$^a$.

A cone clutch 74 is splined upon shaft 65, being normally held in operative engagement with a complementary clutch member 75, on gear 68, through the medium of an expansile helical spring 76, confined between it and a collar 74$^a$ keyed on shaft 65. A lever 77 is provided for holding the clutch 74 out of engagement with its complementary member 75, this being provided with the usual toothed segment and dog, as illustrated in Fig. 14.

A spur gear 78 is similarly mounted to rotate freely upon the shaft 65, this gear having an operative connection with a similar gear 79, through the medium of a chain 80$^a$. Gear 79 is keyed upon a longitudinally disposed main operating shaft 80, revolubly journalled in suitable bearing blocks 81. A cone clutch 82 is splined upon shaft 65 and is arranged to operatively engage a complementary clutch member 83, carried by the spur gear 78. Clutch 82 is normally held in operative engagement with its complementary member 83 by means of an expansile helical spring 84 confined between it and a collar 82$^a$ fixed on shaft 65. A clutch lever 85, as shown in Fig. 11, is also provided for holding these members out of operative engagement.

The digging wheel 40 is driven by shaft 80 through the medium of a spur gear 86 meshing with a similar gear 87 keyed upon a stub shaft 88 and with a similar gear 89, keyed upon a stub shaft 90, through the medium of an idler gear 91. Shaft 80 has a bearing in a block 92 which also supports a stub shaft 93 upon which idler gear 91 is mounted. Stub shafts 88 and 90 are likewise suitably journalled in bearing blocks 94. Flexible shafts 95 operatively connect the stub shafts 80 and 90 with the digging wheel, extending on either side thereof as clearly shown in Fig. 6. As these are identical but one will be described and the numerals applied designate corresponding parts of each. A square, socket shaft 96 carries one member 97 of a universal joint which is connected with a complementary universal joint member 98 carried upon the end of the stub shaft 88. A square shaft 99 telescopes within the member 96 and carries at its outer end a universal joint member 100 operatively connected with a universal joint member 101 on the end of a stub shaft 102. Shaft 102 is suitably journalled in a bearing block 103 carried upon a digging wheel frame member 49. A spur gear or pinion 104 is keyed upon the outer end of the stub shaft 103 and is arranged to mesh with its complementary ring gear teeth 48. This gearing is arranged to turn shafts 95 in opposite directions, to properly drive the digging wheel, and the shafts 95 are made longitudinal extensible and each provided with two universal joints to admit of various vertical and horizontal adjustments of the digging wheel, one of which is illustrated in Fig. 3.

The vertical and horizontal adjustments of the digging wheel 40, as well as the horizontal swinging movement of the crane 27, are selectively effected by the following mechanisms.

A pair of transversely disposed coaxial stub shafts 105 and 106 are revolubly journalled in suitable bearing blocks 107 and have beveled gears 108 and 109, respectively, mounted freely rotatable upon their inner ends. These gears are held against axial movement by collars 108ª and 108ᵇ keyed upon shafts 105 and 106 (see Fig. 12). Both gears 108 and 109 mesh with a similar gear 10 keyed upon shaft 80. Reels 111 and 112 are keyed upon the shafts 105 and 106, respectively, intermediate the standard 107ª of bearing blocks 107 and band brakes 113, the details of which are illustrated in Figs. 12 and 13, are provided for adjustably holding the reels 111 and 112 against rotation.

Referring to these figures, drums 113ª are keyed upon the outer ends of shafts 105 and 106. Semi-circular bands 113ᵇ are secured at their bottoms to a lug 113ᶜ on the block 107 and a hand screw 113ᵈ extends through clamp blocks 113ᵉ on the bands 113ᵇ for manual adjustment of the brake on the drums 113ª.

Clutches 114 and 115 are splined upon shafts 105 and 106, respectively, each having clutch teeth 116 for engaging complementary teeth 116ª upon the gears 108 and 109. The digging wheel adjusting cables 61 are rove around the drum 112 in such manner that rotation of the latter raise the forward end of the digging wheel frame, while its lowering is effected by paying out the cable through the medium of its band brake 113.

The inner end of the digging wheel frame is raised through the medium of a pair of cables 117 (Figs. 4, 7 and 8). These are operatively secured to and passed around blocks 118 and 119; the former being connected, by means of rings 120, to lateral arms 58 of the guide shoe 39 and the latter suspended from the shoe 43, all being vertically disposed on opposite sides of the standard 38. Cables 117 are thence carried forwardly over pulleys 121 (Fig. 2), down to and rove around drum 111. These cables are likewise rove around the drum in a manner to effect a raising of the inner end of the digging wheel frame, while its lowering is accomplished by playing out the cable through the medium of its band brake 113. Two cables 117, with their necessary blocks 118 and 119, are provided to avoid any binding action on the guide shoe 39 upon the standard 38, thus insuring ease of operation.

A second pair of transversely disposed coaxial shafts 122 and 123 are revolubly journalled in suitable bearing blocks 124. These shafts have beveled gears 125 and 126, respectively, mounted to freely rotate upon their inner ends (as shown in Fig. 12) and beveled gears 127 and 128, respectively, keyed to their opposite ends. Clutches 129 and 130 are splined upon shafts 122 and 123, respectively, and each have clutch teeth for engaging complementary clutch teeth upon the gears 125 and 126 (also as shown in Fig. 12). A beveled gear 131 is splined upon shaft 80 for selective engagement with the gears 125 and 126. Upon movement of the gear 131 into engagement with the gears 125 and 126, both of these gears will be simultaneously rotated in opposite directions.

A clutch 132 is splined upon the shaft 80 and provided with clutch teeth to engage complementary teeth upon a complementary clutch member 133 on gear 86, the latter being mounted to rotate freely on shaft 80.

Gear 127 meshes with a similar gear 134 keyed upon one end of a longitudinally disposed shaft 135, this shaft being journalled at one end in a suitable bearing 136 and at its opposite end in a bearing 137 carried by the adjacent rear upright 25. Shaft 135 also extends through an intermediate bearing 138 (see Fig. 6). A beveled gear 139 is mounted to rotate freely on shaft 135, and a clutch 140, splined thereon, has clutch teeth adapted to engage complementary teeth on the gear 139. A similar beveled gear 141 is keyed upon the lower end of a vertically disposed shaft 142, the latter being journalled at its lower end in bearing 138. Gear 139 meshes with gear 141. The upper end of shaft 142 is journalled in a bearing 143, carried by the upper longitudinal frame member 26, and has keyed thereon a beveled gear 144. Gear 144 meshes with a similar gear 145 keyed upon the adjacent end of a transversely disposed screw shaft 146, the latter having its adjacent end also journalled in the bearing member 143.

Gear 128 meshes with a similar gear 147, keyed upon the adjacent end of a longitudinally disposed shaft 148, the latter being journalled in bearings 136ª, 137ª and 138ª like those supporting shaft 135. A beveled gear 149 is mounted freely rotatable upon shaft 148 and a clutch 150 is splined thereon, having clutch teeth to engage complementary teeth on gear 149. A vertically disposed shaft 151 has a complementary beveled gear 152 keyed to its lower end, the lower end of this shaft also being journalled in bearing 138ª. Shaft 151 is journalled at its upper end in a bearing member 143 and has a beveled gear 152 keyed thereon, meshing with a similar gear 153, also keyed upon the adjacent end of the screw shaft 146. Shaft 146 is also journalled at this end in a bearing member 143ª.

An internally screw threaded shoe 154 is mounted longitudinally movable upon the screw shaft 146, and has a finger 155 thereon extending upwardly and engaging between a pair of plates 156 carried by plate 157, the latter extending between and secured to the crane members 28. The plates 156 are substantially parallel and disposed longitudinally of the crane 27, being somewhat elongated to compensate for their arcuate movement when the crane is swung horizontally. An arm 158 extends downwardly from the shoe 154 and has an aperture therein through which a rod 159 extends, the latter being supported between the bearing members 143 and 143ª. By this means rotation of the shoe 154 upon the shaft 146 is prevented, so that at all times the finger 155 extends upwardly in operative engagement with the plates 156.

A beveled gear 160 is mounted freely rotatable upon the shaft 135 and a clutch 161 is splined thereon, having clutch teeth adapted to engage complementary teeth upon the gear 160. A vertically disposed shaft 162 is revolubly journalled at its upper end in bearing 137, and at its lower end in a bearing 163 carried by the frame member 37 (Fig. 8). A beveled gear 164 is keyed upon the upper end of this shaft, meshing with gear 160, and a similar gear 165 is also keyed upon its lower end; the latter meshing with a similar gear 166 keyed upon the adjacent end of a transversely disposed screw shaft 167. Shaft 167 is journalled at each end in bearings 168 carried by the transverse track 36.

A beveled gear 169 is mounted freely rotatable upon shaft 148, and a clutch 170 is splined thereon, being provided with clutch teeth adapted to engage complementary teeth on the gear 169. A vertically disposed shaft 171 is revolubly journalled at its upper end in the bearing 137ª and at its lower end in a bearing 163ª, also carried by the frame member 37. A beveled gear 172 is keyed upon the upper end of shaft 171, meshing with gear 169, and a similar gear 173 is keyed to its lower end. Gear 173 meshes with a similar gear 174 keyed upon adjacent end of screw shaft 167.

An internally screw threaded shoe 175 is mounted longitudinally movable upon the screw shaft 167 and has a rearwardly extending arm 176 connected to the adjacent side of the guide shoe 41 (Figs. 7 and 8).

Clutches 114, 115, 129, 130, 132, 140, 150, 161 and 170 are all axially shifted in the manner and by the means illustrated in Figs. 10 and 11. A typical shift lever 177 is pivotally mounted at its lower end upon a bracket 178. Portions 179 and 180 extend around the clutch member and carry pins 181 which extend into a peripheral groove 182. Gears 130 and 131 are similarly shifted.

Clutches 74 and 82 are normally held in engagement with their respective, complementary members 75 and 83 by springs 76 and 84, as hereinbefore described. They are held out of such engagement, against the action of springs 76 and 84 by means of levers 77 and 85, respectively. As they are identical, but one of these is illustrated in Fig. 14. The lever 77 is pivotally mounted at its lower end upon a bracket 183. This carries a notched segment 184 adapted to be engaged by a dog 185. Dog 185 is normally held in engagement with the segment by a spring 186, and is manually withdrawn by the grip lever 187 through the medium of a link connection 188. Pins 189 are carried by lever 77 and extend into a peripheral groove 190 in the clutch 74. The manner of retaining the freely rotatable gears 68 and 78 is also shown in this figure. Collars 191 and 192 are keyed to their respective shafts on opposite sides, as shown.

Gears 125, 126, 139, 149, 160 and 169 are all freely mounted upon their respective shafts and retained against axial movement the same as gears 108 and 109, as illustrated in Fig. 12.

In the operation of my dredge the main drive of vehicle is accomplished through the medium of the shaft 65, gears 68 and 69, chain 70, shaft 71, gears 72 and 73 and shaft 19. By providing the cone clutch 74 the vehicle may be started and stopped at will, without stopping the motor 64.

Under ordinary conditions no adjustments of the digging wheel 40 will be made during operation or movement of the vehicle, unless it is in raising and lowering the digging wheel to move it into and out of digging engagement with the ground. This will ordinarily be accomplished through the medium of the cables 61 and in some instances a simultaneous vertical movement of the guide shoe 39 upon the standard 38. Aside from such instances the vertical adjustment of the shoe 39 on standard 38 will be effected before the vehicle is put in motion so that the only remaining adjustment will be the raising or lowering of the free end of the digging wheel frame. However, under some circumstances, the crane 27 may be swung laterally, to effect movement of the digging wheel 40 relative to an irregular ditch bank.

When it is desired to effect any adjustments of the digging wheel frame, the vehicle is not in motion, the clutch 82 is first thrown out. Gear 78 being mounted freely rotatable on shaft 65, shaft 80 will not be rotated when the clutch 82 is out.

To drive the digging wheel clutch 132 is first moved into engagement with its complementary member 133, gear 131 moved out of engagement with gears 125 and 126 as shown in Fig. 6, and clutches 114 and 115 moved out of engagement with their complementary clutch portions carried by gears 108 and 109. Clutch 82 is then thrown in and shaft 80 rotated through the medium of chain 80ª and gear 79. This will drive shafts 95, through the medium of gears 86, 87, 93 and 89, and rotate the digging wheel through the medium of gears 104 and 48. All of the gears rotate in the directions indicated by the arrows on the several figures of the drawings, shafts 95 rotating in opposite directions to revolve the digging wheel as indicated in Figs. 2 and 4. To stop rotation of the digging wheel clutch 82 is thrown out.

Movement of the vehicle is effected through the mechanism hereinbefore described, by the clutch 74, which operates independently of the operation of any other mechanism. Through the medium of clutches 74 and 82 simultaneous operation of the vehicle with operation of the digging wheel may be accomplished or one effected independently of the other.

When it is desired to raise the free end of the digging wheel frame, through the medium of cables 61, the clutch 82 is thrown out and clutch 115 then moved into engagement with its complementary clutch portion on gear 109. As gears 108 and 109 are always rotated by gear 110, whenever the shaft 80 is rotated, and as these are driven in opposite directions, one of the clutches 114 or 115 is always out while the other is in. Moving clutch 115, as above described, the clutch 82 is then thrown in, causing rotation of the drum 112, through the medium of gears 110 and 109. During this time the band brake 113 is released and is again tightened as soon as the digging wheel has been raised the desired extent. To lower the digging wheel it is only necessary to release the band brake 113 allowing it to fall by gravity.

When it is desired to raise the forward end of the digging wheel frame, clutch 82 being out, clutch 115 is left out and clutch 114 moved into operative engagement with gear 108, the band brake 113 loosened and clutch 82 moved in. To lower the forward end of the digging wheel frame it is only necessary to throw clutch 114 out and loosen band brake 113 the desired extent.

As hereinbefore noted the cables 61 and 117 are rove around the drums 112 and 111 to effect a raising of these members and this may be done irrespective of direction of rotation of the drums.

When it is desired to swing the crane 27, say from the position illustrated in Fig. 1 to that illustrated in Fig. 3, the clutch 82 is first thrown out, clutches 130 and 150 are then moved in, and gear 131 moved into engagement with gears 125 and 126, all other clutches being out as illustrated in Fig. 5. Clutch 82 is then thrown in effecting rotation of shaft 80, which, through the medium of gears 131 and 126, shaft 123, gears 128 and 147, shaft 148, gears 149 and 152, shaft 151 and gears 152 and 153, rotates the screw shaft 146. This effects a movement of the shoe 154 to the left in Fig. 7 carrying the crane 27 to the position illustrated in Fig. 3. The movement of the crane in the opposite direction is similarly effected by taking out the clutches 130 and 150, moving in clutches 129 and 140, thus effecting rotation of the screw shaft 146 in the opposite direction and a consequent movement of the shoe to the right in Fig. 7, through the medium of gears 131 and 125, shaft 122, gears 127 and 134, shaft 135, gears 139 and 141, shaft 142 and gears 144 and 145.

When it is desired to effect transverse movement of the forward end of the digging wheel frame, say from the position illustrated in Fig. 1 to that shown in Fig. 3, clutch 82 is similarly first taken out and gear 131 moved into engagement with gears 125 and 126. As the movement is to be to the right in Fig. 8, clutches 129 and 161 moved in and clutch 140 moved out. This, through the medium of gears 131 and 125, shaft 122, gears 127 and 134, shaft 135, gears 160 and 164, shaft 162 and gears 165 and 166, causes movement of the shoe 175 on the screw shaft 167 to the right in Fig. 8. To shift this end of the digging wheel frame in the opposite direction (gear 130 is moved out of and gear 131 moved into operative engagement with gears 125 and 126) clutches 130 and 170 moved in and clutches 129, 161 and 150 moved out. This, through the medium of gears 131 and 126, shaft 123, gears 128 and 147, shaft 148, gears 169 and 172, shaft 171 and gears 173 and 174 will rotate screw shaft 167 in the opposite direction, thereby moving shoe 175 to the left in Fig. 8.

By providing this screw means for laterally shifting the crane and digging wheel frame there is no necessity for providing further locking means for maintaining these members in adjusted position. However, it may be observed that other equivalent means for effecting these adjustments may be utilized.

From the foregoing it will be readily seen that I have provided an extremely flexible carrying and operating means for the digging wheel and with my arrangement this wheel may be readily adjusted to dig ditches of different widths and depths as well as to adjust it to clear vegetation off banks of ditches where these banks are of various slopes. Notwithstanding the fact that I have provided a very flexible and efficient means for adjusting the cutting angle of the digging wheel it is likewise extremely strong and durable and practical in operation.

Ordinarily the several adjustments above described will be made individually and while the vehicle is at rest, but it can be seen that they may be made simultaneously, and while the vehicle is in motion. For instance, either one or both ends of the digging wheel frame may be raised or lowered during movement of the vehicle and at the same time the crane 27 and standard 38 may be simultaneously or successively moved in the same or opposite directions. The provision for movement of the ends of the digging wheel frame in opposite directions affords the greatest possible angular adjustment, relative to the longitudinal center of the vehicle, on a comparatively narrow vehicle.

Having described a preferred form of my invention, I claim:

1. A device of the character described, comprising a vehicle, a digging wheel, a supporting frame for the digging wheel, a universal joint connection between the supporting frame and vehicle, said connection being transversely and vertically movable relative to the vehicle.

2. A device of the character described, comprising a vehicle, a digging wheel, a supporting frame for the digging wheel, a universal joint connection between the digging wheel frame and vehicle, said connection being transversely and vertically movable relative to the vehicle, a source of motive power and flexible driving means connecting said source of motive power and the digging wheel.

3. A device of the character described, comprising a vehicle, a digging wheel, a supporting frame for the digging wheel, a universal joint connection between the digging wheel frame and the vehicle, said connection being transversely and vertically movable relative to the vehicle, and means for transversely and vertically movably supporting the opposite end of the digging wheel frame.

4. A device of the character described comprising a vehicle, a digging wheel, a supporting frame for the digging wheel, a pivotal connection between the digging wheel frame and the vehicle, a crane pivotally mounted on the vehicle to swing in a horizontal plane and a flexible connection between said crane and the free end of the digging wheel frame to permit vertical movement of said frame.

5. A device of the character described, comprising a vehicle, a digging wheel mounted on said vehicle to rotate in a vertical plane, means to effect vertical and horizontal movement of the digging wheel relative to the vehicle without varying the angularity of its plane of rotation relative to the vehicle and means to vary the angularity of the plane of rotation of the digging wheel relative to the vehicle.

6. A device of the character described comprising, a vehicle, a digging wheel, a supporting frame for the digging wheel, a vertically disposed standard carried by the vehicle, a shoe movably carried by the standard, a pivotal connection between the digging wheel frame and the shoe, a crane transversely movably mounted on the vehicle and means connecting the free end of the digging wheel frame and the crane.

7. A device of the character described, comprising a vehicle, a digging wheel mounted on said vehicle to rotate in a vertical plane, means to effect vertical and horizontal movement of the digging wheel relative to the vehicle without varying the angularity of its plane of rotation relative to the vehicle, means to vary the angularity of the plane of rotation of the digging wheel relative to the vehicle, a source of motive power on the vehicle and flexible driving means connecting the source of motive power and the digging wheel.

8. A device of the character described comprising, a vehicle, a digging wheel, a supporting frame for the digging wheel, a vertically disposed standard carried by the vehicle, said standard being mounted for movement transversely of the vehicle, a shoe movably carried by the standard, a pivotal connection between the digging wheel frame and shoe, a transversely movable crane carried by the vehicle above the digging wheel, flexible means of connection between the crane and digging wheel frame, a source of motive power and flexible driving means connecting the source of motive power and the digging wheel.

9. A device of the character described, comprising, a vehicle, a digging wheel adapted to rotate in a vertical plane, a supporting frame for the digging wheel, a pivotal connection between the digging wheel frame and vehicle, and means to selectively effect lateral movement of the opposite end of the digging wheel frame, in opposite directions, relative to the vehicle.

10. A device of the character described comprising, a vehicle, a digging wheel adapted to rotate in a vertical plane, a supporting frame for the digging wheel, a transversely movable, pivotal connection between the digging wheel frame and vehicle permitting vertical and transverse swinging movement of the digging wheel, means for supporting the opposite end of the digging wheel frame and means for selectively effecting transverse movement of the pivoted end of the digging wheel frame, in opposite directions, relative to the vehicle.

11. A device of the character described comprising, a vehicle, a digging wheel adapted to rotate in a vertical plane, a supporting frame for the digging wheel, a transversely movable pivotal connection between the digging wheel frame and vehicle, a transversely movable support for the opposite end of the digging wheel frame, means for selectively effecting transverse movement of the pivoted end of said frame, in opposite directions, relative to the vehicle and means for selectively effecting transverse movement of the opposite end of the digging wheel frame, in opposite directions, relative to the vehicle, said selective means being each operable independently of the other.

12. A device of the character described comprising, a vehicle, a digging wheel adapted to rotate in a vertical plane, a supporting frame for the digging wheel, a vertically movable pivotal connection between the digging wheel frame and the vehicle, a transversely movable support for the opposite end of the digging wheel frame, means for selectively effecting vertical movement of the pivoted end of said frame, in opposite directions, relative to the vehicle and means for selectively effecting transverse movement of the opposite end of the digging wheel frame, in opposite directions, relative to the vehicle, said selective means being each operable independently of the other.

13. A device of the character described comprising, a vehicle, a digging wheel adapted to rotate in a vertical plane, a supporting frame for the digging wheel, a laterally movable standard carried by the vehicle, a shoe vertically and rotatably mounted on said laterally movable member, a pivotal connection between one end of the digging wheel frame and said shoe, a laterally movable crane carried by the vehicle, a flexible elevating connection between the crane and the free end of the digging wheel frame, means to selectively effect movement of the standard, in opposite directions, means to selectively effect vertical movement of the shoe in opposite directions, and means to selectively effect lateral movement of the crane in opposite directions, said selective means being each operable independently of the other.

In witness that I claim the foregoing I have hereunto subscribed my name this 24th day of November, 1925.

ARY C. CLARK.